May 31, 1960 K. R. DURST 2,938,685
CROSS-WIND LANDING GEAR
Filed Sept. 19, 1955 2 Sheets-Sheet 1
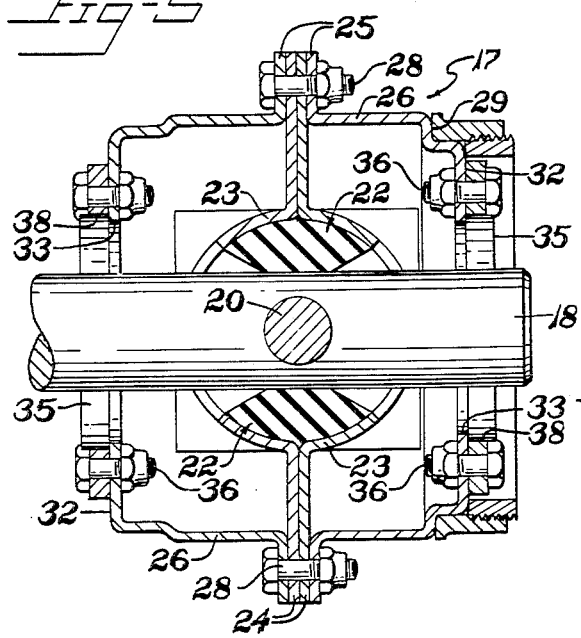
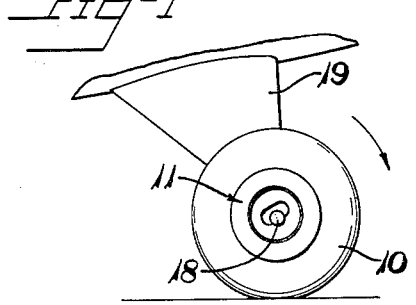
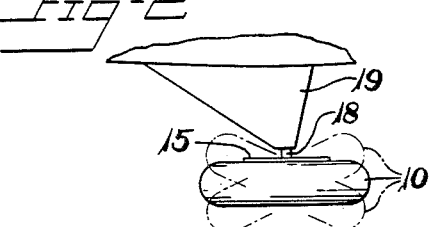
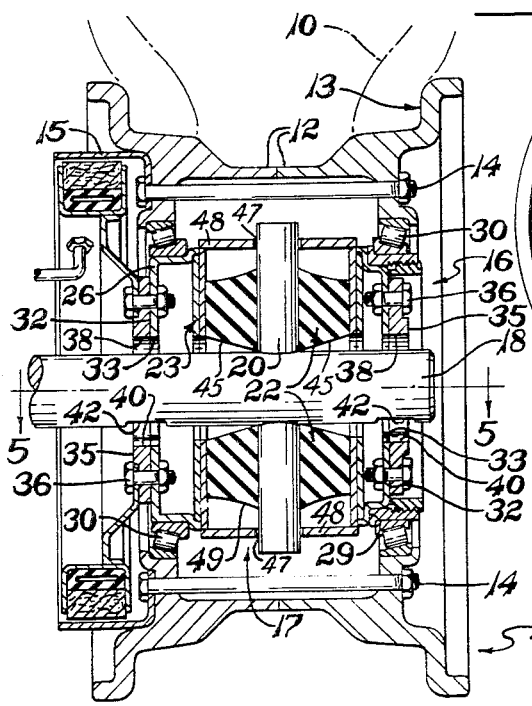
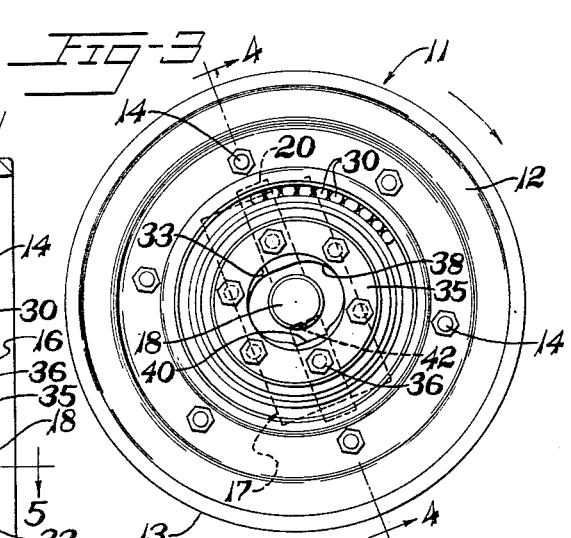
Inventor
Kenneth R. Durst

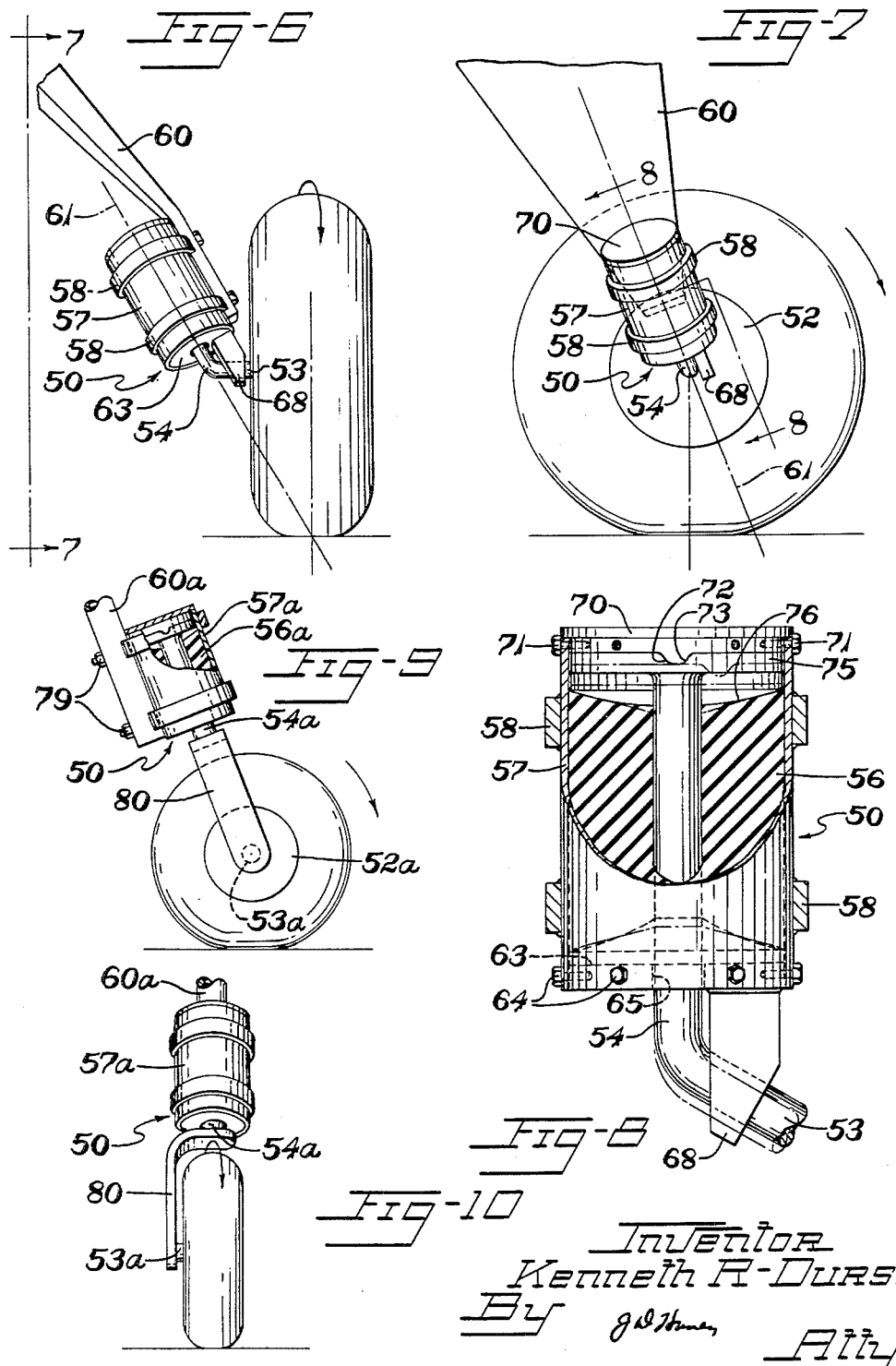

United States Patent Office 2,938,685
Patented May 31, 1960

2,938,685

CROSS-WIND LANDING GEAR

Kenneth R. Durst, Troy, Ohio, assignor to The B. F. Goodrich Company, New York, N.Y., a corporation of New York Filed Sept. 19, 1955, Ser. No. 535,129

7 Claims. (Cl. 244—103)

This invention relates to an improved cross-wind landing gear for aircraft, the gear being effective to minimize the possibility of hazards such as strut failure, tire blowouts, ground loops and the like occurring when an airplane is landed into a wind directed transversely to the landing runway.

A principal object of this invention is to provide cross-wind gear which, in comparison with types of gear heretofore proposed for this purpose, is a simpler, lighter and more durable mechanical structure and which is substantially less expensive. Accordingly, this invention makes the advantages of cross-wind gear available on an economical basis to operators of small light aircraft and this is the field of service in which cross-wind gear is especially useful. The gear of this invention may be utilized with the existing undercarriage of conventional type aircraft.

The gear of this invention includes a mechanism associated with an aircraft wheel so that the wheel may swivel with a castering action to align itself for rotation in the direction of the forward momentum of the aircraft along a runway, even though the body of the aircraft is veered at an angle to the runway. This mechanism includes a body of rubber which suspends the wheel from the undercarriage of the aircraft and which is adapted to be distorted torsionally by swivelling or castering movements of the wheel. The rubber body advantageously absorbs a substantial proportion of the initial shock load imposed on the undercarriage during a landing and additionally dampens the shaking or shimmy effect which is characteristic of wheels supported for castering movement. When the aircraft is airborne, the rubber body maintains the wheel in normal position, i.e. aligned for rotation in a plane longitudinal of the aircraft, and in position for swivelling relative to the body of the aircraft during a landing. When the full weight of the aircraft is carried by the wheels during taxiing after landing, or during take-offs, the wheels are locked in normal alignment by a cam structure engageable with the wheel axle or other non-rotatable member. This latter result is advantageously accomplished by axial distortion of the rubber body in response to the diametrical displacement of the wheel from its normal airborne position when the weight of the aircraft is transferred to the wheels upon landing.

In this specification the word "caster" is used to denote a wheel structure which is mounted to swivel about an axis which intersects a wheel-supporting surface ahead of the centroid of the area or "footprint" of the wheel in contact with the wheel-supporting surface, and the term "castering movement" refers to the swivelling movement of a wheel about such an axis.

The invention will be further described with reference to the accompanying drawings in which:

Fig. 1 is a side elevation of an aircraft wheel structure embodying the invention, the wheel being shown at rest on a runway;

Fig. 2 is a top view of the wheel shown in Fig. 1 and also showing in dotted lines the maximum positions to which the wheel may be swivelled about its castered support;

Fig. 3 is a side elevation of the wheel structure of Fig. 1, drawn to an enlarged scale with the tire omitted and showing the relative position of the various elements when the aircraft is airborne;

Fig. 4 is a cross-sectional view taken on the line 4—4 of Fig. 3;

Fig. 5 is a cross-sectional view taken on the line 5—5 of Fig. 4;

Fig. 6 is a front elevation of a modified form of the invention;

Fig. 7 is a side elevation of the wheel of Fig. 6 taken from a position indicated by the line 7—7 adjacent Fig. 6;

Fig. 8 is a view taken from a position generally indicated by the line 8—8 of Fig. 7 and with portions broken away;

Fig. 9 is a side elevation showing another embodiment of the invention; and

Fig. 10 is a front view of the gear shown in Fig. 9.

Two general types of cross-wind gear are shown in the drawings, viz. that of Figs. 1–5 in which a castering mechanism is inside a wheel hub; and that of Figs. 6–10 in which a castering mechanism is outside the wheel hub.

Referring to the inside-the-hub gear of Figs. 1–5, a tire 10 is supported on a main landing wheel 11 formed of two annular wheel sections 12 which fit coaxially together to define a flanged rim 13 to receive the beads of the tire. The mating wheel sections 12 are fastened together by a series of tie bolts 14 near the flanged rim 13. As shown in Fig. 4 the heads of the tie bolts 14 may be utilized to secure an annular brake drum 15 to the one of the wheel sections 12.

The wheel sections 12 mutually house and are rotatable about a non-rotatable hub 16 which includes a caster mechanism 17 engaged with a non-rotatable main horizontal axle 18 secured to a strut 19 (see Fig. 2) forming part of the undercarriage of the airplane. The axle 18 projects through the hub 16 and near the outer end of the axle inside the wheel sections there is a king pin 20 which perpendicularly intersects the axle and is rigidly secured to the axle by welding or other suitable means. The king pin 20 is bonded to the interior surface of a resilient rubber sleeve 22 of the caster mechanism which sleeve completely surrounds the king pin and the junction of the king pin with the axle.

The exterior surface of the rubber sleeve 22 is enclosed by and is bonded to a pair of semi-cylindrical metal shell sections 23 (see Fig. 5) having outwardly directed mutually-abutting side flanges 24. Each set of abutting flanges 24 are received between similar side flanges 25 of a pair of metal members 26 which cooperate to form a box-like enclosure around the sections 23. The corresponding flanges 24 and 25 are secured together on opposite sides of the king pin 20 by a series of bolts 28. Each of the metal members 26 includes annular end shoulder 29 (see Fig. 4) on which is seated the inner face of one of the main wheel bearings 30 upon which the wheel sections 12 are rotatable relative to the hub 16, axle 18 and king pin 20. Each of the members 26 also includes an annular end face 32 extending radially inwardly from its respective shoulder 29 to a central opening 33 surrounding the axle 18 and through which the axle projects. A cam plate 35 is fastened to each end face 32 by bolts 36, the cam plate including a central opening 38 which registers with the opening 33 of the end face. The edge of each opening 38 is formed with a recess 40 in a region of the cam plate between the axle and the ground, which recess is complementary in shape to a similar recess 42 on the axle. As hereinafter explained, the axle recesses 42 are interlocked with their respective recesses 40 when the wheel is in a straight ahead position and the weight of the airplane is supported by the wheel. The recesses 40 and the areas 42 thereby cooperate to lock the wheel against castering movement when the airplane is taxiing and the like.

The central portion of the rubber sleeve 22 surrounding the axle 18 on each side of the king pin 20 is shaped to provide generally conical surfaces 45 diverging from the king pin so that the wheel may be swivelled about the king pin relative to the stationary axle 18 through a substantial arc to impart torsional stress in the rubber body 22. The opening 38 through each cam plate 35 is generally elliptical in shape as shown in Fig. 3 and the major axis of this elliptical opening determines the maximum angle away from the normal straight ahead position through which the wheel may be swivelled. Preferably the openings of the cams 35 are shaped such that the wheel may be swivelled through about 25° on either side of the normal straight ahead position.

To provide a castering action for the wheel the axle 18 is engaged with the undercarriage 19 of the aircraft such that the king pin 20 slopes forwardly and downwardly with respect to the front of the aircraft and the king pin is also located in the vertical plane through the center of the wheel. Preferably the king pin is inclined about 10° to 15° away from the vertical.

Fig. 3 shows the relative positions of the king pin 20, the axle 18 and the cam plates 35 when the wheel is airborne. Under this condition the rubber body 22 maintains the wheel in its straight ahead position so that the axle 18 is centered in the elliptical opening 38 in each cam plate 35 and there is no metal-to-metal contact whatever between the wheel sections 12 and the supporting axle 18. As the wheels of an aircraft equipped with this gear strike a runway in a cross-wind landing, each will tend to caster or swivel about its respective king pin 20 into alignment with the direction of the forward momentum of the aircraft. Also, the wheels and their respective housing members will be shifted upwardly or diametrically relative to the axle 18 and king pin 20 to bring the axle into engagement with inner peripheral edges of the cam plates 35. For this purpose the upper and lower ends of the king pin 20 are slidably supported by and extend through central openings 47 in the upper and lower portions 48 of the shell sections 23. Also it may be noted in Fig. 4 that the upper and lower ends 49 of the rubber body 22 terminate a substantial distance from the adjacent portions 48 of the shell sections to permit limited axial movement of the shell sections 23 relative to the king pin and a corresponding axial distortion of the rubber body. Inasmuch as the wheel is wholly insulated from the axle 18 by the rubber body 22 at the instant the wheel engages a runway, the rubber body 22 advantageously absorbs a substantial portion of the initial landing shock imparted to the wheel.

After landing an aircraft may taxi on the runway with the wheels in swivelled position or the plane may be veered to return the wheels to a straight ahead position. Once the wheels are shifted straight ahead the recesses 42 of the axle engage the recesses 40 of the cam plates to lock the wheels so that they resist castering movement while the plane is thereafter maneuvering on the runway or during a subsequent takeoff. The depth of the cam recesses 40 and the shape of the complementary axle recesses 42 is such that the thrust of the propeller when taxiing and taking off is insufficient to disengage the axle 18 from the cams.

As soon as the aircraft is again airborne, the resiliency of the rubber body 22 shifts the wheel diametrically relative to the axle 18 and the king pin to disengage bosses 42 and return the wheel to the position of Fig. 3.

In Figs. 6–10 cross-wind landing gear is provided in which the castering mechanism 50 is located outside the wheel structure. This type gear is comparatively inexpensive and is particularly suitable for light aircraft.

It has been found that for light planes satisfactory cross-wind landings may be made when the wheels of the aircraft are permitted to swivel in the outboard direction only, i.e. to be swivelled outwardly relative to the front of the aircraft from the straight ahead position. This is because substantially all the weight of a light airplane is carried by the leading or foremost wheel when a light plane touches the runway while veered into a cross-wind and the drag or scuffing of the trailing wheel is negligible. The cross-wind landing gear of Figs. 6–8 permit a wheel to swivel outwardly only. In this structure a wheel 52 is supported on an axle 53 which extends horizontally inwardly from the wheel and has a portion 54 directed upwardly and rearwardly relative to the body of the aircraft. This upwardly projecting portion 54 is surrounded by and bonded to a cylindrical rubber sleeve 56, the exterior surface of which is enclosed in a cylindrical shell 57. The shell 57 is encircled by a pair of rings 58 which are secured to the shell and which are bolted to the lower end of a strut 60, forming a part of the undercarriage of the aircraft. The shell 57 is located substantially concentrically around the upwardly directed inner member 54 and is fastened to the strut 60 in a position such that the axis 61 of inner member 54 intersects the runway at about the center line of the wheel ahead of the center of the tire footprint (see Fig. 7).

The bottom of the shell 57 is enclosed by flat plate 63 (Fig. 8) which is fastened bolted to the shell by bolts 64 and the upright member 54 extends through a hole 65 at the center of this plate and is freely rotatable therein. Projecting downwardly from the plate 63 forwardly of the axle 53 is a stop bar 68 which is welded to plate 63 and prevents the wheel 52 from being swivelled or turned inwardly relative to the strut 60 toward the nose of the aircraft. It should be understood that the opposite wheel of an aircraft will be provided with a corresponding but allochiral caster mechanism to that of Figs. 6–8 so that neither wheel may be swivelled inwardly toward the nose of the plane.

The upper end of shell 57 is covered by a cap plate 70 which is fastened to the shell by the bolts 71. The lower surface of plate 70 has a plurality of projecting lugs 72 which are adapted to engage in complementary recesses 73 formed in the upper surfaces of a cam plate 75 secured to the upper end of inner member 54. The cam plate 75 fits snugly within and is freely rotatable inside the shell 57 between the upper surface 76 of rubber sleeve 56 and plate 70 when the lugs 72 are disengaged from their respective recesses 73. The lugs 72 are disengaged when the plane is airborne.

As the leading or foremost wheel 52 strikes the runway in a cross-wind landing, the leading wheel will swivel outwardly and, simultaneously, will be displaced diametrically so that the lugs 72 are dragged across the top surface of the cam plate 75. The rubber body 56 is stressed or distorted torsionally by the swivelling movement of the wheel and distorted axially by the diametrical movement of the wheel. After landing the heading of the aircraft may be varied to return the wheels to straight ahead position, thereby unwinding the torsional distortion in the rubber body. In the straight ahead position with the weight of the aircraft supported on the wheels, the inner member 54 is urged upwardly axially of the shell to maintain the lugs 72 into engagement with the recesses 73. The engagement of these lugs locks the wheel against further swivelling movement. The rubber body 56 is sufficiently resilient to permit the axial movement of the member 54 relative to the shell 57 and the resiliency of the rubber body disengages the lugs 72 as soon as a wheel is airborne.

In Figs. 9 and 10 a cross-wind gear is shown which employs a caster mechanism identical to that of Figs. 6–8 in structure and in operation except that the stop bar 68 is omitted. Also, the caster mechanism of Figs. 9–10 is mounted in the vertical central plane of the tire with its inner member 54a inclined downwardly and forwardly relative to the nose of the aircraft to provide the desired castering action. The shell 57a in these views is secured to a downwardly extending strut 60a by the bolts 79. The wheel 52a is rotatably mounted on an axle 53a which is supported by an inverted L-shaped bracket 80. The upper end of the bracket 80 is fastened to the bottom of inner member 54a so that turning force exerted on the wheel is transmitted by bracket 80 to the rubber sleeve 56a. The resiliency of the rubber sleeve 56a in this embodiment serves to center the wheel when the plane is airborne in the manner described for the preceding structures. Since this embodiment omits stop bar 68, wheel 52a may be swivelled to either side of its normal straight ahead position. This latter embodiment may be used advantageously for aircraft nose or tail wheels, as well as in connection with main landing wheels.

Variations may be made within the scope of the invention as it is defined in the following claims.

I claim:

1. Cross-wind landing gear comprising a wheel having a central hub portion and an outer peripheral portion rotatable on said hub portion, a tubular member within said hub portion integrally connected to said hub portion, an axle extending through said hub portion and said tubular member, a king pin rigidly secured to said axle transversely thereof to provide a castering axis for the wheel, said king pin extending axially and concentrically of said tubular member, and a cylindrical circumferentially continuous resilient body of rubber-like material interposed between and attached to said king pin and said tubular member, at both the inner and outer peripheral surfaces of said rubber body, said body being distortable torsionally to resist castering movements of said wheel about said king pin and being distortable in axial shear to resist diametrical movements of said wheel, the resilience of said rubber body normally maintaining said tubular member in a neutral position relative to said king pin to maintain the wheel in a rotational plane longitudinal of the aircraft when the wheel is airborne.

2. Cross-wind landing gear comprising a wheel having a central hub portion and an outer peripheral portion rotatable on said hub portion, a first member within said hub portion integrally connected to said hub portion, an axle extending into said hub portion transversely to said first member, a second member rigidly secured to said axle and spaced concentrically from said first member, a sleeve of resilient rubber material interposed between and secured to the opposing concentric surfaces of said members along the outer and inner peripheral surfaces of said sleeve and normally maintaining said first member and said hub in a predetermined position relative to said second member and axle, said first and second members being oriented relative to the hub and the axle to provide a caster axis for the wheel, and said first member and said hub being axially rotatable relative to said second member and said axle to distort said sleeve torsionally in response to castering movement of the wheel, and said first member and said hub being movable axially of said second member to distort said sleeve axially in response to diametrical movement of the wheel, means for limiting the axial displacement of said first member relative to said second member, and means for locking said hub and said first member against said rotation to prevent castering movement of the wheel when said first member is displaced axially to the limit of said axial movement thereof.

3. Apparatus in accordance with claim 2 in which said means locking said hub and said first member includes a cam secured to said hub and engageable with said axle.

4. Cross-wind landing gear comprising a strut depending from an aircraft, a wheel, and a caster mounting interconnecting said strut with said wheel to provide for castering movement and for diametrical movement of the wheel relative to said strut, said mechanism comprising a pair of rigid members disposed in spaced concentric relation and an annular body of resilient rubber-like material filling the space between said members and being attached to each member, one of said members being rigidly supported by said strut, and the other of said members having said wheel rotatably connected thereto, the latter said member being movable axially relative to said rigidly supported member in response to diametrical movement of the wheel to distort said rubber body in axial shear, and the latter said member also being rotatable axially relative to said rigidly supported member in response to castering movement of the wheel, the resilience of said rubber body normally maintaining said members in a neutral relative axial and rotatable position to maintain the wheel in a rotational plane longitudinal of the aircraft when the wheel is airborne, means associated with each said pair of rigid members for locking said members to preclude relative axial displacement thereof beyond a predetermined limit and to lock said wheel against castering movement when the wheel is in a rotational plane longitudinal of the aircraft and supporting the weight of the aircraft, said means normally being maintained in axially-spaced disengaged relation when said rigid members are positioned by said rubber body in their relative neutral position.

5. Cross-wind landing gear for aircraft comprising a wheel and a caster mounting therefor normally positioning said wheel for rotation in a plane longitudinal of the aircraft when the wheel is airborne, said caster mounting having a first member supported rigidly by the aircraft and having longitudinal axis oriented to provide a fixed castering axis for the wheel, a second member spaced concentrically from said first member and to which the wheel is rotatably connected, said first member and said second member being interconnected solely by a body of resilient rubber material and filling the space between said members, said second member being movable axially relative to said rigid first member to distort said rubber body in axial shear and thereby oppose diametrical displacement of the wheel, and said second member also being movable rotatably relative to said rigid first member to distort said rubber body torsionally and thereby oppose castering movement of the wheel, means associated with each said members for limiting said relative axial displacement of said members, said means being normally spaced from each other when the wheel is airborne and adapted to engage to preclude castering movement when the wheel is displaced diametrically to its maximum extent and is also in a rotational plane longitudinal of the aircraft.

6. Cross-wind landing gear comprising a wheel, an axle therefor, a rigid strut, a tubular member secured to said strut and having a longitudinal axis oriented to provide a fixed castering axis for said wheel, a second member connected to said axle away from the wheel and disposed coaxially through said tubular member, an annular resilient body of rubber material interposed between said tubular member and said second member and secured to each said members, said rubber body normally maintaining said wheel, when airborne, in a plane longitudinal of the aircraft and resisting castering movements of said wheel by torsional distortion of said body and opposing diametrical movements of said wheel by axial distortion of said body, a cam secured to said tubular member, and cam engaging means secured to said second member and spaced from said rubber body, said cam and said cam-engaging means being normally spaced from each other and operable to mutually engage by movement of said second member axially through said tubular member against the resistance of said body through axial distortion in response to diametrical movement of said wheel, said cam and said cam-engaging means interlocking to preclude castering movement of said wheel when the weight of the aircraft is exerted on said wheel.

7. Cross-wind landing gear in accordance with claim 6 which gear further includes a stop plate projecting from said tubular member and engageable with said axle to preclude castering motion of said wheel inwardly toward the forward portion of an aircraft.

References Cited in the file of this patent

UNITED STATES PATENTS

| 2,575,761 | Loudenslager | Nov. 20, 1951 |
| 2,581,935 | Brown | Jan. 8, 1952 |

FOREIGN PATENTS

| 532,149 | Great Britain | Jan. 17, 1941 |
| 883,921 | France | Apr. 5, 1943 |